US012175899B2

(12) United States Patent
Lyou et al.

(10) Patent No.: US 12,175,899 B2
(45) Date of Patent: Dec. 24, 2024

(54) MEASUREMENT CIRCUIT AND DISPLAY DEVICE INCLUDING THE SAME

(71) Applicant: LG DISPLAY CO., LTD., Seoul (KR)

(72) Inventors: Si Hyeong Lyou, Paju-si (KR); Jang Hoon Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/973,146

(22) Filed: Oct. 25, 2022

(65) Prior Publication Data

US 2023/0206795 A1 Jun. 29, 2023

(30) Foreign Application Priority Data

Dec. 29, 2021 (KR) ........................ 10-2021-0191867

(51) Int. Cl.

| | |
|---|---|
| ***H10K 59/131*** | (2023.01) |
| ***G01L 1/22*** | (2006.01) |
| ***G01R 27/08*** | (2006.01) |
| ***G06F 1/16*** | (2006.01) |
| ***G09G 3/00*** | (2006.01) |
| ***G09G 3/32*** | (2016.01) |
| ***G09G 3/3225*** | (2016.01) |
| ***G09G 3/3266*** | (2016.01) |
| ***H01L 21/66*** | (2006.01) |
| ***H05K 1/02*** | (2006.01) |
| ***H10K 77/10*** | (2023.01) |

(52) U.S. Cl.

CPC ............... *G09G 3/006* (2013.01); *G09G 3/32* (2013.01); *G09G 3/3225* (2013.01); *G09G 2300/0426* (2013.01); *G09G 2330/12* (2013.01)

(58) Field of Classification Search

CPC ........... G09G 3/006; G09G 3/32–3225; G09G 2300/0426; G09G 2330/12

See application file for complete search history.

(56) References Cited

U.S. PATENT DOCUMENTS

| | | | | |
|---|---|---|---|---|
| 2013/0082843 | A1* | 4/2013 | Wurzel | G06F 1/1601 324/525 |
| 2016/0043010 | A1* | 2/2016 | Kwak | H10K 77/111 438/15 |
| 2016/0232826 | A1* | 8/2016 | Cho | H10K 59/131 |
| 2018/0053466 | A1* | 2/2018 | Zhang | G01L 1/2281 |
| 2018/0158741 | A1* | 6/2018 | Kim | H01L 22/32 |
| 2018/0342185 | A1* | 11/2018 | Lee | G01R 27/08 |
| 2021/0153343 | A1* | 5/2021 | Shin | H05K 1/0268 |
| 2022/0271102 | A1* | 8/2022 | Kim | H10K 59/131 |

* cited by examiner

*Primary Examiner* — Lin Li

(74) *Attorney, Agent, or Firm* — POLSINELLI PC

(57) ABSTRACT

A display device includes a display panel including a display area and a non-display area, first and second wiring circuit units located in a first, a second, and a third non-display area, and a panel pad portion located in a fourth non-display area, the panel pad portion having a left panel pad portion and a right panel pad portion, in which the first/second wiring circuit unit has a wiring start point and a wiring end point located at a point close to the left/right panel pad portion, and the wiring start point/end point of the first wiring circuit unit is electrically connected to a pad portion included in the left/right panel pad portion, thus an effect of simplifying the circuit can be achieved by unifying the crack measurement circuit of the display panel and the bonding resistance measurement circuit between the display panel and the flexible circuit board into one integrated measurement circuit.

11 Claims, 10 Drawing Sheets

MEASUREMENT CIRCUIT AND DISPLAY DEVICE INCLUDING THE SAME

CROSS-REFERENCE TO RELATED APPLICATION

This application claims the benefit of Korean Patent Application No. 10-2021-0191867, filed on Dec. 29, 2021, which is hereby incorporated by reference in its entirety.

BACKGROUND

Field of the Disclosure

The present disclosure relates to a measurement circuit and a display device including the same.

Description of the Background

With the development of information technology, the market for display devices, which are connection media between users and information, has been growing. Accordingly, there has been an increase in use of display devices such as a light-emitting display device (LED), a quantum dot display device (QDD), and a liquid crystal display device (LCD).

The display devices described above each include a display panel including subpixels, a driving unit configured to output a driving signal for driving the display panel, a power supply unit configured to generate power to be supplied to the display panel or the driving unit, etc.

In each of the display devices, when a driving signal, for example, a scan signal, a data signal, etc. is supplied to the subpixels formed in the display panel, an image may be displayed by a selected subpixel transmitting light or directly emitting light.

SUMMARY

Accordingly, the present disclosure is directed to a measurement circuit and a display device including the same that substantially obviate one or more problems due to limitations and disadvantages of the conventional art.

More specifically, the present disclosure is to unify a crack measurement circuit of a display panel and a bonding resistance measurement circuit between the display panel and a flexible circuit board into one integrated measurement circuit to simplify a circuit, reduce bezels when manufacturing the display panel, and increase a degree of freedom in design.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, a display device includes a display panel including a display area and a non-display area, the non-display area including a first non-display area, a second non-display area, a third non-display area and a fourth non-display area, first and second wiring circuit units located in the first non-display area, the second non-display area, and the third non-display area of the display panel, and a panel pad portion located in the fourth non-display area of the display panel, the panel pad portion having a left panel pad portion located on a left side of the fourth non-display area and a right panel pad portion located on a right side of the fourth non-display area, in which the first wiring circuit unit has a wiring start point and a wiring end point located at a point close to the left panel pad portion, and the second wiring circuit unit has a wiring start point and a wiring end point located at a point close to the right panel pad portion, and the wiring start point of the first wiring circuit unit is electrically connected to a pad portion included in the left panel pad portion, and the wiring end point of the first wiring circuit unit is electrically connected to a pad portion included in the right panel pad portion.

The wiring start point of the second wiring circuit unit may be electrically connected to the pad portion included in the right panel pad portion, and the wiring end point of the second wiring circuit unit may be electrically connected to the pad portion included in the left panel pad portion.

The wiring start point of the first wiring circuit unit may be electrically connected to the pad portion included in the left panel pad portion by a first jumping wiring portion located on a layer different from a layer of the first wiring circuit unit and the second wiring circuit unit, and the wiring end point of the first wiring circuit unit may be electrically connected to the pad portion included in the right panel pad portion by a first circuit connection wiring portion located on a layer different from a layer of the first wiring circuit unit and the second wiring circuit unit.

The wiring start point of the second wiring circuit unit may be electrically connected to the pad portion included in the right panel pad portion by a second jumping wiring portion located on a layer different from a layer of the first wiring circuit unit and the second wiring circuit unit, and the wiring end point of the second wiring circuit unit may be electrically connected to the pad portion included in the left panel pad portion by a second circuit connection wiring portion located on a layer different from a layer of the first wiring circuit unit and the second wiring circuit unit.

The left panel pad portion may include a first left panel pad portion, a second left panel pad portion, a third left panel pad portion and a fourth left panel pad portion, the first, third, and fourth left panel pad portions may be electrically connected to the second circuit connection wiring portion by a first pad connection wiring portion, and the second left panel pad portion may be electrically connected to the wiring start point of the first wiring circuit unit by the first jumping wiring portion.

The right panel pad portion may include a first right panel pad portion, a second right panel pad portion, a third right panel pad portion and a fourth right panel pad portion, the first, third, and fourth right panel pad portions may be electrically connected to the first circuit connection wiring portion by a second pad connection wiring portion, and the second right panel pad portion may be electrically connected to the wiring start point of the second wiring circuit unit by the second jumping wiring portion.

The first wiring circuit unit may include a 1-1 th wiring portion connected to the wiring start point of the first wiring circuit unit, a 1-2 th wiring portion connected to the wiring end point of the first wiring circuit unit, and a plurality of first resistors connected in series and parallel to the 1-1 th wiring portion and the 1-2 th wiring portion, and the second wiring circuit unit may include a 2-1 th wiring portion connected to the wiring start point of the second wiring circuit unit, a 2-2 th wiring portion connected to the wiring end point of the second wiring circuit unit, and a plurality of second resistors connected in series and parallel to the 2-1 th wiring portion and the 2-2 th wiring portion. The plurality of first resistors or the plurality of second resistors may be used to determine the presence or absence of a crack in the display panel.

In another aspect of the present disclosure, a measurement circuit includes first and second wiring circuit units-located in a first region, a second region, and a third region of a substrate, and a pad portion located in a fourth region of the substrate, the pad portion having a left pad portion located on a left side of the fourth region and a right pad portion located on a right side of the fourth region, in which the first wiring circuit unit has a wiring start point and a wiring end point located at a point close to the left pad portion, and the second wiring circuit unit has a wiring start point and a wiring end point located at a point close to the right pad portion, the wiring start point of the first wiring circuit unit is electrically connected to a pad portion included in the left pad portion, and the wiring end point of the first wiring circuit unit is electrically connected to a pad portion included in the right pad portion, and the wiring start point of the second wiring circuit unit is electrically connected to the pad portion included in the right pad portion, and the wiring end point of the second wiring circuit unit is electrically connected to the pad portion included in the left pad portion.

The wiring start point of the first wiring circuit unit may be electrically connected to the pad portion included in the left pad portion by a first jumping wiring portion located on a layer different from a layer of the first wiring circuit unit and the second wiring circuit unit, the wiring end point of the first wiring circuit unit may be electrically connected to the pad portion included in the right pad portion by a first circuit connection wiring portion located on a layer different from a layer of the first wiring circuit unit and the second wiring circuit unit, the wiring start point of the second wiring circuit unit may be electrically connected to the pad portion included in the right pad portion by a second jumping wiring portion located on a layer different from a layer of the first wiring circuit unit and the second wiring circuit unit, and the wiring end point of the second wiring circuit unit may be electrically connected to the pad portion included in the left pad portion by a second circuit connection wiring portion located on a layer different from a layer of the first wiring circuit unit and the second wiring circuit unit.

The left pad portion may include a first left pad portion, a second left pad portion, a third left pad portion and a fourth left pad portion, the first, third, and fourth left pad portions may be electrically connected to the second circuit connection wiring portion by a first pad connection wiring portion, and the second left pad portion may be electrically connected to the wiring start point of the first wiring circuit unit by the first jumping wiring portion, the right pad portion may include a first right pad portion, a second right pad portion, a third right pad portion and a fourth right pad portion, and the first, third, and fourth right pad portions may be electrically connected to the first circuit connection wiring portion by a second pad connection wiring portion, and the second right pad portion may be electrically connected to the wiring start point of the second wiring circuit unit by the second jumping wiring portion.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings.

DETAILED DESCRIPTION

Figure 1:
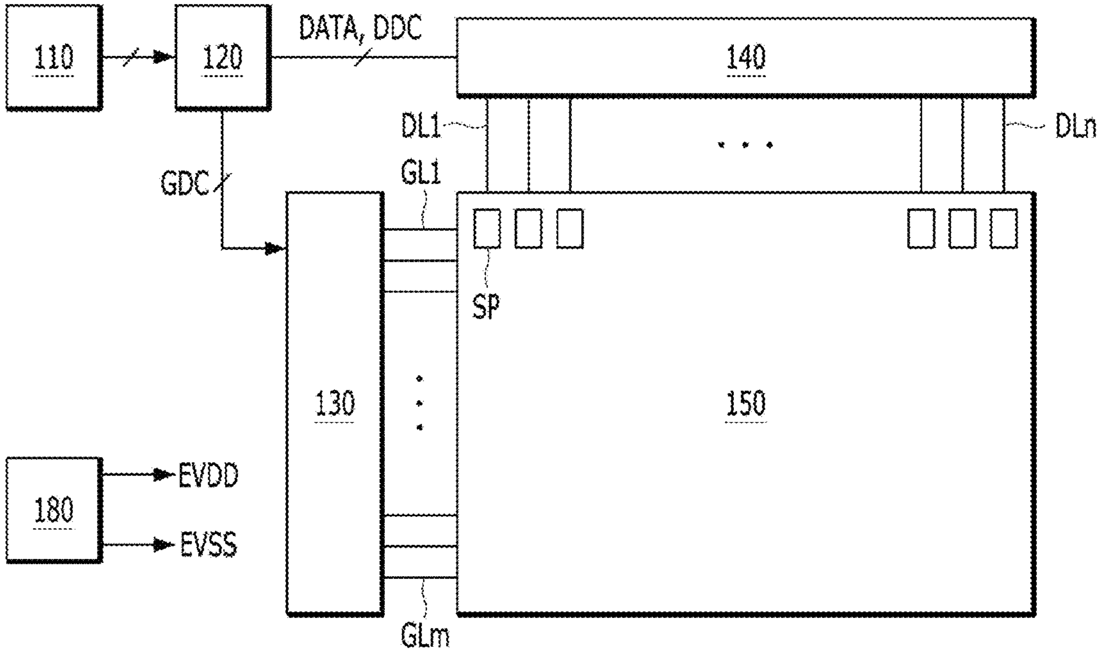
FIG. 1 is a block diagram schematically illustrating an LED.

The advantages and features of the present disclosure, and the method for achieving the advantages and features will become apparent with reference to aspects described below in detail in conjunction with the accompanying drawings. However, the present disclosure is not limited to the aspects disclosed below and may be implemented in a variety of different forms, and these aspects allow the disclosure of the present disclosure-to be complete and are merely provided to fully inform those of ordinary skill in the art to which the present disclosure-belongs of the scope of the disclosure. Further, the disclosure is merely defined by the scope of the claims.

The shapes, sizes, proportions, angles, numbers, etc. disclosed in the drawings for describing the aspects of the present disclosure are illustrative, and thus the present disclosure is not limited to the illustrated elements. The same reference symbol refers to the same element throughout the specification. In addition, in describing the present disclosure, when it is determined that a detailed description of a related known technology may unnecessarily obscure the subject matter of the present disclosure, such a detailed description will be omitted. When “equipped with”, “including”, “having”, “consisting of”, etc. are used in this specification, other parts may also be present, unless “only” is used. When an element is expressed in the singular, the element may be interpreted as being plural unless otherwise explicitly stated.

Although "first", "second", etc. may be used to describe various elements, these elements are not limited by these terms. These terms are merely used to distinguish one element from another element. Therefore, a first element mentioned below may be a second element within the spirit of the present specification.

Respective features of several aspects of the present specification may be partially or wholly united or combined with each other, and various types of interlocking and driving are technically possible. The respective aspects may be implemented independently of each other, or may be implemented together in an interrelated relationship.

A display device according to the present disclosure may be implemented as a television, a video player, a personal computer (PC), a home theater, an automobile electric device, a smartphone, etc., but is not limited thereto. The display device according to the present disclosure may be implemented as an LED, a QDD, an LCD, etc. However, hereinafter, for convenience of description, an LED that directly emits light based on an inorganic light-emitting diode or an organic light-emitting diode will be given as an example.

Figure 2:
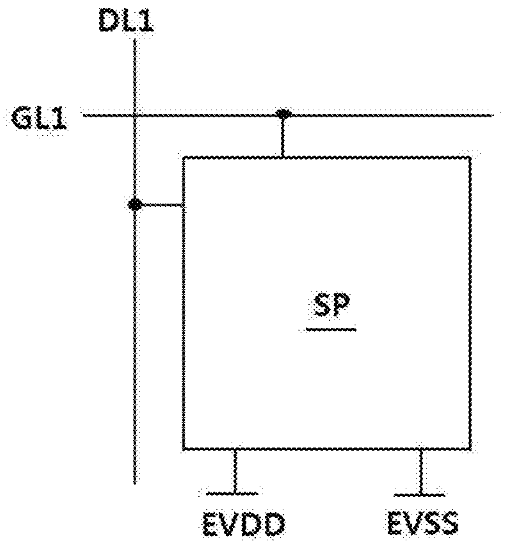
FIG. 2 is a configuration diagram schematically illustrating a subpixel illustrated in FIG. 1.

FIG. 1 is a block diagram schematically illustrating the LED, and FIG. 2 is a configuration diagram schematically illustrating a subpixel illustrated in FIG. 1.

As illustrated in FIGS. 1 and 2, the LED may include an image supply unit 110, a timing controller 120, a gate driving unit 130, a data driving unit 140, a display panel 150, a power supply unit 180, etc.

The image supply unit (set or host system) 110 may output various driving signals along with an image data signal supplied from the outside or an image data signal stored in an internal memory. The image supply unit 110 may supply a data signal and various driving signals to the timing controller 120.

The timing controller 120 may output a gate timing control signal GDC for controlling the operation timing of the gate driving unit 130, a data timing control signal DDC for controlling the operation timing of the data driving unit 140, various synchronization signals (VSYNC, which is a vertical synchronization signal, and HSYNC, which is a horizontal synchronization signal), etc. The timing controller 120 may supply a data signal DATA supplied from the image supply unit 110 together with the data timing control signal DDC to the data driving unit 140. The timing controller 120 may be formed as an integrated circuit (IC) and mounted on a printed circuit board, but is not limited thereto.

The gate driving unit 130 may output a gate signal (or a gate voltage) in response to the gate timing control signal GDC supplied from the timing controller 120. The gate driving unit 130 may supply a gate signal to subpixels included in the display panel 150 through gate lines GL1 to GLm. The gate driving unit 130 may be formed as an IC or may be formed directly on the display panel 150 using a GIP method, but is not limited thereto.

The data driving unit 140 may sample and latch the data signal DATA in response to the data timing control signal DDC supplied from the timing controller 120, convert a digital data signal into an analog data voltage based on a gamma reference voltage, and output the analog data voltage. The data driving unit 140 may supply a data voltage to the subpixels included in the display panel 150 through data lines DL1 to DLn. The data driving unit 140 may be formed as an IC and mounted on the display panel 150 or mounted on a printed circuit board, but is not limited thereto.

The power supply unit 180 may generate a high-potential voltage and a low-potential voltage based on an external input voltage supplied from the outside, and output the high-potential voltage and the low-potential voltage through a first power line EVDD and a second power line EVSS. The power supply unit 180 may generate and output a voltage necessary to drive the gate driving unit 130 (for example, a gate voltage including a gate high voltage and a gate low voltage) or a voltage necessary to drive the data driving unit 140 (a drain voltage including a drain voltage and a half-drain voltage) in addition to the high-potential voltage and the low-potential voltage.

The display panel 150 may display an image in response to a driving signal including a gate signal and a data voltage, a driving voltage including the high-potential voltage and the low-potential voltage, etc. The subpixels of the display panel 150 directly emit light. The display panel 150 may be manufactured based on a substrate having rigidity or flexibility, such as glass, silicon, polyimide, etc. In addition, the subpixels that emit light may include pixels including red, green, and blue or pixels including red, green, blue, and white.

For example, one subpixel SP may be connected to the first data line DL1, the first gate line GL1, the first power line EVDD, and the second power line EVSS, and may include a pixel circuit having a switching transistor, a driving transistor, a capacitor, an organic light-emitting diode (OLED), etc. Since the subpixel SP used in the LED directly emits light, a circuit configuration is complicated. In addition, there are various compensation circuits for compensating for deterioration of the OLED that emits light as well as the driving transistor that supplies a driving current necessary to drive the OLED. Accordingly, note that the subpixel SP is simply illustrated in the form of a block.

Meanwhile, in the above description, the timing controller 120, the gate driving unit 130, the data driving unit 140, etc. have been described as individual elements. However, depending on the implementation method of the light-emitting display device, one or more of the timing controller 120, the gate driving unit 130, and the data driving unit 140 may be integrated into one IC.

Figure 3:
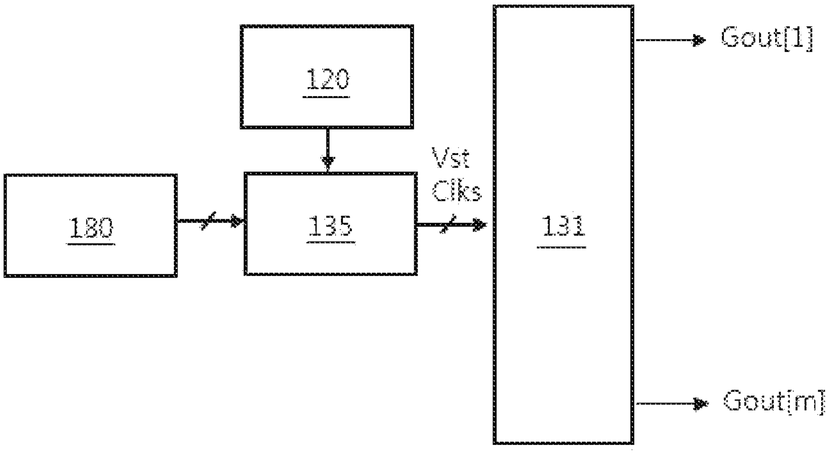
FIGS. 3 and 4 are diagrams for describing a configuration of a gate-in-panel (GIP) type gate driving unit.
Figure 4:
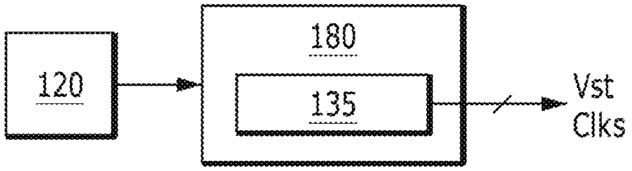
Figure 5:
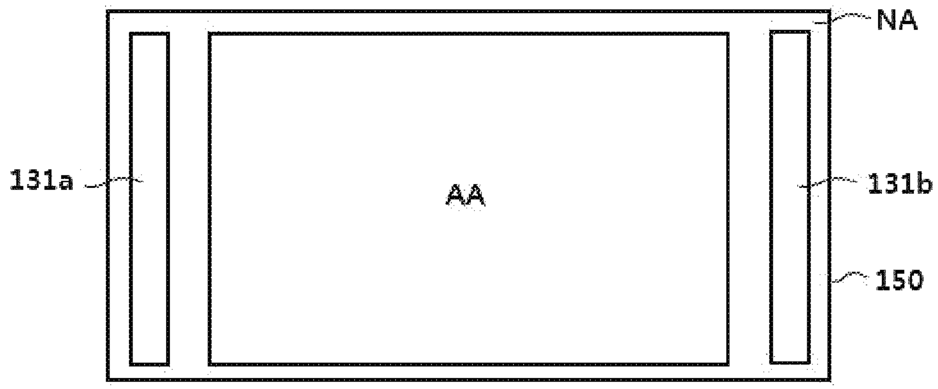
FIG. 5 is a diagram illustrating an arrangement example of the GIP type gate driving unit.

FIGS. 3 and 4 are diagrams for describing a configuration of a GIP type gate driving unit, FIG. 5 is a diagram illustrating an arrangement example of the GIP type gate driving unit, and FIGS. 6(*a*)-6(*d*) are diagrams illustrating various shapes of the display panel.

As illustrated in FIG. 3, the GIP type gate driving unit 130 may include a shift register 131 and a level shifter 135. The level shifter 135 may generate clock signals Clks, a start signal Vst, etc. based on signals and voltages output from the timing controller 120 and the power supply unit 180. The clock signals Clks may be generated in the forms of different J-phases (J being an integer greater than or equal to 2), such as two-phase, four-phase, and eight-phase. The shift register 131 may output gate signals Gout[1] to Gout[m] based on the clock signals Clks, the start signal Vst, etc.

As illustrated in FIGS. 3 and 4, unlike the shift register 131, the level shifter 135 may be independently formed as an IC or may be included in the power supply unit 180, which is only an example and the present disclosure is not limited thereto.

As illustrated in FIG. 5, shift registers 131*a* and 131*b* outputting scan signals in the GIP type gate driving unit may be disposed in a non-display area NA of the display panel 150. The shift registers 131*a* and 131*b* may be formed as thin films on the display panel 150 using a GIP method. The shift registers 131*a* and 131*b* are illustrated as being disposed in the non-display area NA on left and right sides in the display panel 150. However, the present disclosure is not limited thereto.

Figure 6A:
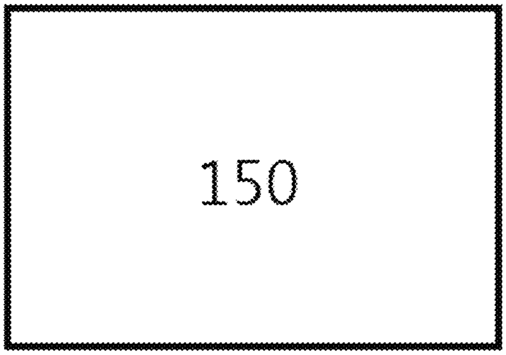
FIGS. 6A, 6B, 6C and 6D are diagrams illustrating various shapes of a display panel.
Figure 6B:
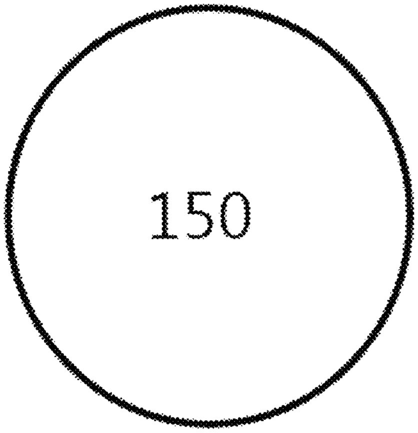
Figure 6C:
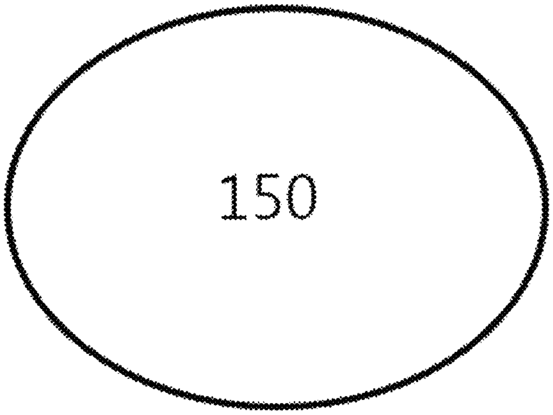
Figure 6D:
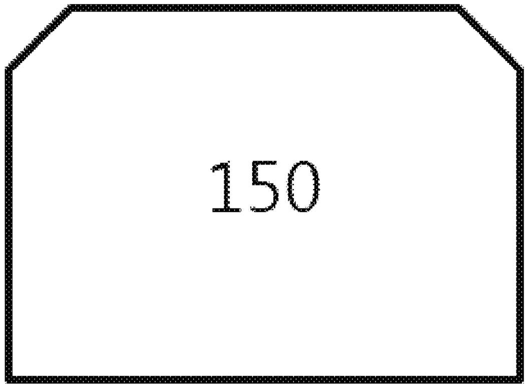

As illustrated in FIGS. 6A, 6B, 6C and 6D, the display panel 150 may be implemented in various shapes, such as a rectangle (or a quadrangle) shown in FIG. 6A, a circle shown in FIG. 6B, an oval shown in FIG. 6C, and a hexagon (or a polygon) shown in FIG. 6D. Except for the generally widely used rectangular display panel 150 illustrated in FIG. 6A, the display panel 150 of each of FIGS. 6B, 6C and 6D has a shape different from a conventional shape (or a rectangular shape), and thus is also referred to as a deformed display panel.

Figure 7:
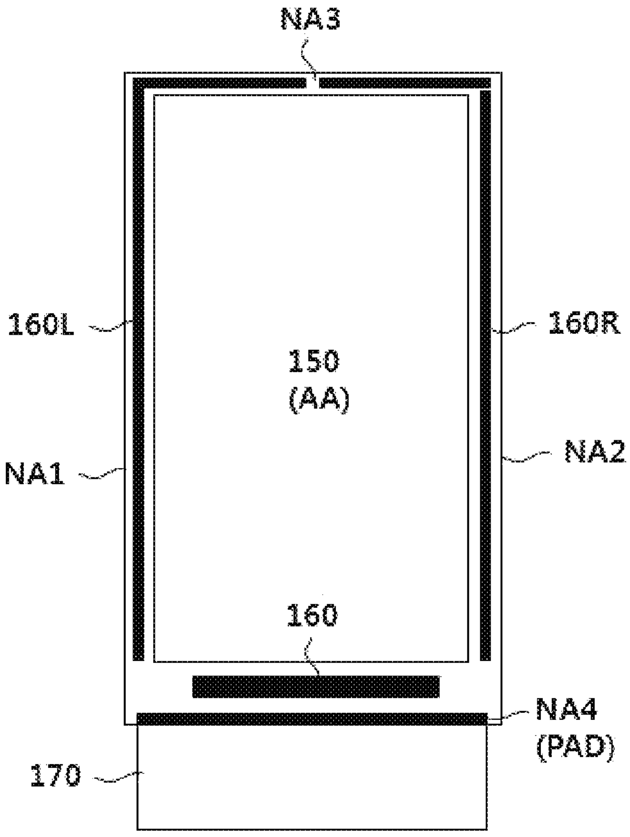
FIG. 7 is a diagram illustrating a part of the LED according to an aspect of the present disclosure.
Figure 8:
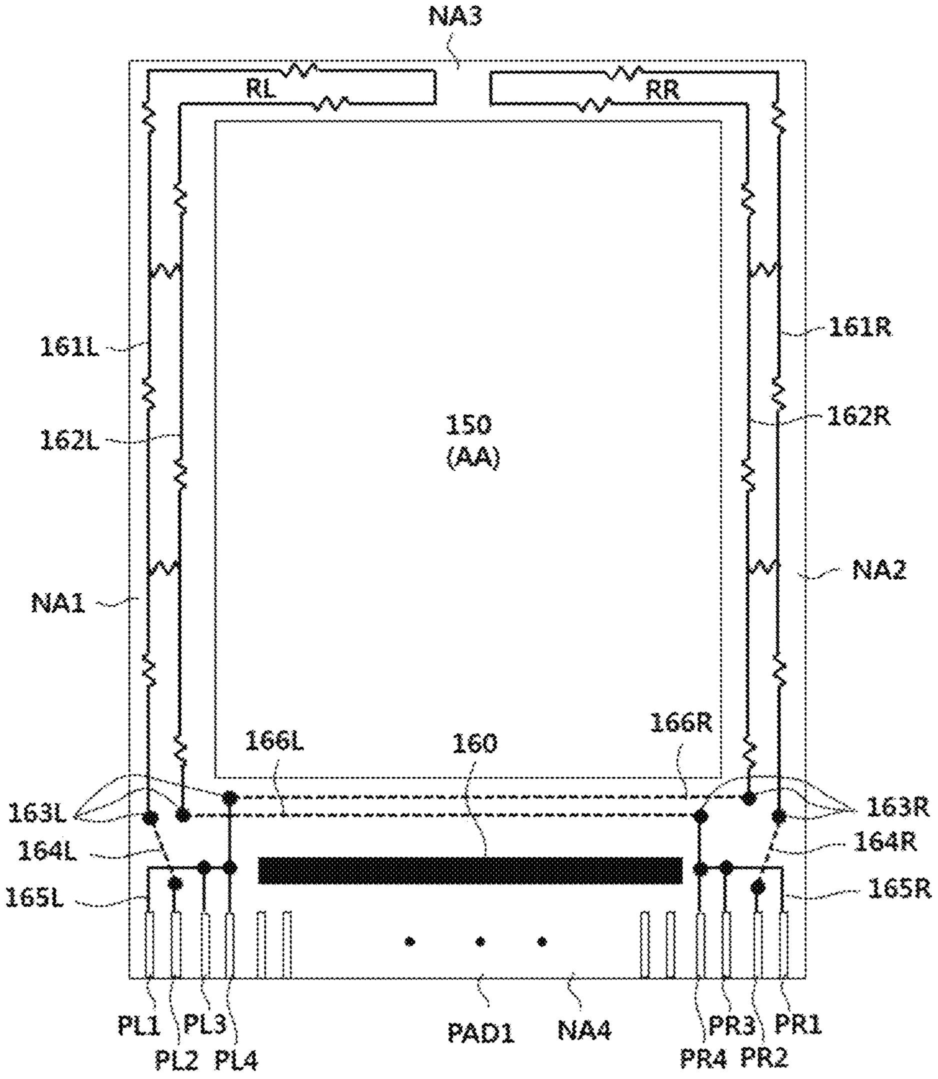
FIG. 8 is a diagram illustrating in detail a part related to an integrated measurement circuit formed on a display panel of FIG. 7.
Figure 9:
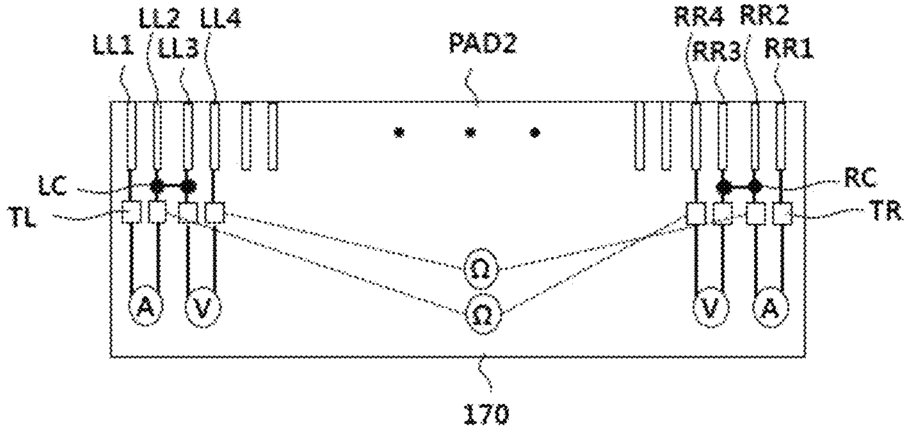
FIG. 9 is a diagram illustrating in detail a part related to an integrated measurement circuit formed on a flexible circuit board of FIG. 7.
Figure 10:
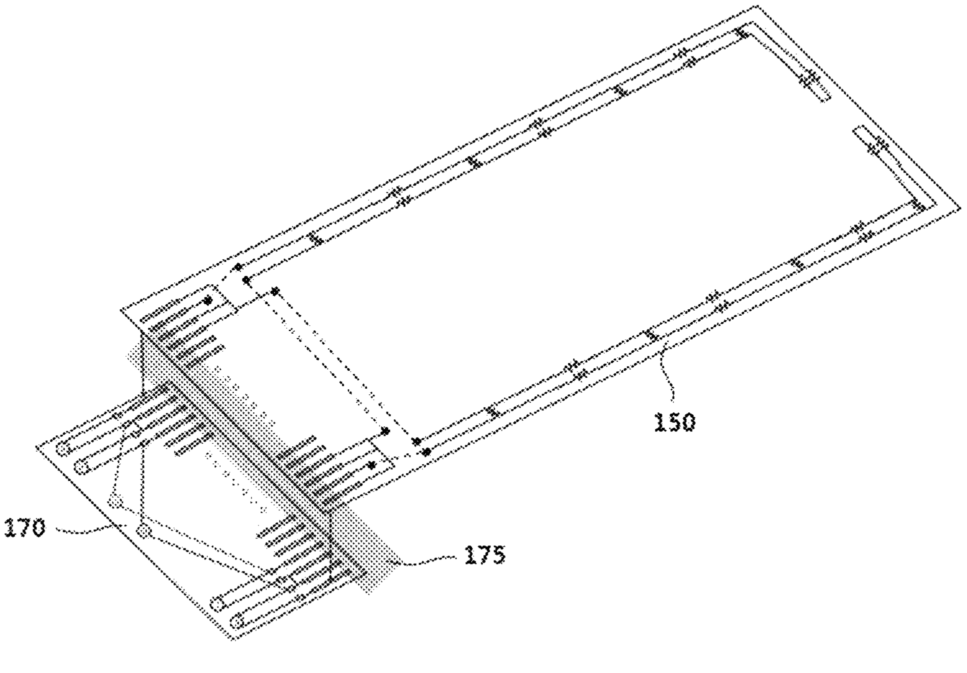
FIG. 10 is a diagram illustrating an attachment example of the display panel and the flexible circuit board according to an aspect of the present disclosure.

FIG. 7 is a diagram illustrating a part of the LED according to an aspect of the present disclosure, FIG. 8 is a diagram illustrating in detail a part related to an integrated measurement circuit formed on the display panel of FIG. 7, FIG. 9 is a diagram illustrating in detail a part related to an integrated measurement circuit formed on a flexible circuit board of FIG. 7, and FIG. 10 is a diagram illustrating an attachment example of the display panel and the flexible circuit board according to an aspect of the present disclosure.

As illustrated in FIG. 7, the display panel 150 may include a display area AA for displaying an image and non-display areas NA1 to NA4 for non-displaying an image. A driving unit 160 and a pad portion PAD may be located in a fourth non-display area NA4 of the display panel 150.

The driving unit 160 is located in the fourth non-display area NA4 (lower non-display area) of the display panel 150, and may be located between the display area AA and the pad portion PAD. The driving unit 160 may be a device in which the timing controller and the data driving unit described with reference to FIG. 1 are integrated.

The pad portion PAD is located in the fourth non-display area NA4 of the display panel 150, and may be located between the driving unit 160 and an edge of the fourth non-display area NA4. The pad portion PAD may include a panel pad portion PAD1 for the display panel 150 and the substrate pad portion PAD2 of the flexible circuit board 170. The pad portion PAD may serve to facilitate attachment and electrical connection to the flexible circuit board 170. Although not illustrated, the flexible circuit board 170 may be electrically connected to a main board to receive a data signal, etc. In addition, a device necessary for driving the display panel 150, such as a power supply unit, may be located on the flexible circuit board 170.

As illustrated in FIG. 7, integrated measurement circuits 160L and 160R may be located in a first non-display area NA1 (left non-display area), a second non-display area NA2 (right non-display area), and a third non-display area NA3 (upper non-display area) of the display panel 150. The integrated measurement circuits 160L and 160R may be located in a non-display area defined on a first substrate (an array substrate on which a transistor, etc. is formed) of the display panel 150.

Note that, in FIG. 7, the shift register is not illustrated and omitted to illustrate positions where the integrated measurement circuits 160L and 160R are disposed.

The first integrated measurement circuit 160L may be located along the first non-display area NA1 and the third non-display area NA3. The first integrated measurement circuit 160L may be located in a partial region (half) of the third non-display area NA3 to be electrically separated and divided from the second integrated measurement circuit 160R. The second integrated measurement circuit 160R may be located along the second non-display area NA2 and the third non-display area NA3. The second integrated measurement circuit 160R may be located in a partial region (half) of the third non-display area NA3 to be electrically separated and divided from the first integrated measurement circuit 160L.

As illustrated in FIG. 8, the first integrated measurement circuit 160L may include first wiring circuit units 161L and 162L wired along the first non-display area NA1 and the third non-display area NA3, a first contact portion 163L, a first jumping wiring portion 164L, a first pad connection wiring portion 165L, and a first circuit connection wiring portion 166L.

The first wiring circuit units 161L and 162L may include a 1-1 th wiring portion 161L and a 1-2 th wiring portion 162L. In addition, the first wiring circuit units 161L and 162L may include a plurality of first resistors RL located between wires of the 1-1 th wiring portion 161L, between wires of the 1-2 th wiring portion 162L, and between wires of the 1-1 th wiring portion 161L and the 1-2 th wiring portion 162L.

The 1-1 th wiring portion 161L may have a wiring start point at a point close to left panel pad portions PL1 to PL4. The 1-1 th wiring portion 161L starts to be wired from the wiring start point, is wired along an edge of the first non-display area NA1, and may be wired to have a wiring end point in a partial region of the third non-display area NA3. The 1-2 th wiring portion 162L may have a wiring start point at the wiring end point of the 1-1 th wiring portion 161L (a point at which a wiring direction is changed to the opposite direction). The 1-2 th wiring portion 162L may be wired to have the same path as that of the 1-1 th wiring portion 161L while being spaced apart from the 1-1 th wiring portion 161L, and may be wired to have a wiring end point at the wiring start point of the 1-1 th wiring portion 161L.

The plurality of first resistors RL may be disposed between wires of the 1-1 th wiring portion 161L, between wires of the 1-2 th wiring portion 162L, and between wires of the 1-1 th wiring portion 161L and wires of the 1-2 th wiring portion 162L so that a specific resistance value (for example, kilo ohm) is formed in the first wiring circuit units 161L and 162L. The plurality of first resistors RL may be disposed in a series-parallel mixed form to provide a resistance value for easily identifying a crack location on the display panel 150. The plurality of first resistors RL may all have the same resistance value. However, the present disclosure is not limited thereto.

The first contact portion 163L may be located at the wiring start point of the 1-1 th wiring portion 161L, a wiring end point of the 1-2 th wiring portion 162L, and a wiring end point (or wiring change point) of the first circuit connection wiring portion 166L. The first contact portion 163L may be defined as a contact hole that assists in connecting the 1-1 th wiring portion 161L, the 1-2 th wiring portion 162L, and the first circuit connection wiring portion 166L to another wire or a pad portion.

The first jumping wiring portion 164L may be wired such that the 1-1 th wiring portion 161L and the second left panel pad portion PL2 are electrically connected to each other. The first jumping wiring portion 164L may have one side connected to the first contact portion 163L located at the wiring start point of the 1-1 th wiring portion 161L, and the other side connected to the second left panel pad portion PL2. The first jumping wiring portion 164L may be insulated by an insulating layer and positioned on a different layer from that of the 1-1 th wiring portion 161L and the 1-2 th wiring portion 162L. The first jumping wiring portion 164L may be located on a layer higher or lower than that of the 1-1 th wiring portion 161L and the 1-2 th wiring portion 162L.

The first pad connection wiring portion 165L may be wired such that the first left panel pad portion PL1, the third left panel pad portion PL3, and the fourth left panel pad portion PL4 are electrically connected to one another. The first pad connection wiring portion 165L may be located on the same layer as that of the 1-1 th wiring portion 161L and the 1-2 th wiring portion 162L. The first pad connection wiring portion 165L may be wired from the fourth left panel pad portion PL4 to extend to an area close to a lower left display area AA. A wiring end point of the first pad connection wiring portion 165L may be located in the area close to the lower left display area AA.

The first circuit connection wiring portion 166L may be wired along a fourth non-display area AA such that the 1-2 th wiring portion 162L is connected to the second pad connection wiring portion 165R. The first circuit connection wiring portion 166L may have one side connected to the first contact portion 163L formed at the wiring end point of the 1-2 th wiring portion 162L, and the other end connected to the second contact portion 163R formed at a wiring end point of the second pad connection wiring portion 165R. The first circuit connection wiring portion 166L may be insulated by an insulating layer and located on a different layer from that of the 1-1 th wiring portion 161L and the 1-2 th wiring portion 162L. The first circuit connection wiring portion 166L may be located on a layer higher or lower than that of the 1-1 th wiring portion 161L and the 1-2 th wiring portion 162L. The first circuit connection wiring portion 166L may be located on the same layer as that of the first jumping wiring portion 164L.

The second integrated measurement circuit 160R may include second wiring circuit units 161R and 162R wired along the first non-display area NA1 and the third non-display area NA3, a second contact portion 163R, a second jumping wiring portion 164R, a second pad connection wiring portion 165R, and a second circuit connection wiring portion 166R.

The second wiring circuit units 161R and 162R may include a 2-1 th wiring portion 161R and a 2-2 th wiring portion 162R. In addition, the second wiring circuit units 161R and 162R may include a plurality of second resistors RR located between wires of the 2-1 th wiring portion 161R, between wires of the 2-2 th wiring portion 162R, and between wires of the 2-1 th wiring portion 161R and wires of the 2-2 th wiring portion 162R.

The 2-1 th wiring portion 161R may have a wiring start point at a point close to right panel pad portions PR1 to PR4. The 2-1 th wiring portion 161R starts to be wired from the wiring start point, is wired along an edge of the second non-display area NA2, and may be wired to have a wiring end point in a partial region of the third non-display area NA3. The 2-2 th wiring portion 162R may have a wiring start point at the wiring end point of the 2-1 th wiring portion 161R (a point at which a wiring direction is changed to the opposite direction). The 2-2 th wiring portion 162R may be wired to have the same path as that of the 2-1 th wiring portion 161R while being spaced apart from the 2-1 th wiring portion 161R, and may be wired to have a wiring end point at the wiring start point of the 2-1 th wiring portion 161R.

The plurality of second resistors RR may be disposed between wires of the 2-1 th wiring portion 161R, between wires of the 2-2 th wiring portion 162R, and between wires of the 2-1 th wiring portion 161R and wires of the 2-2 th wiring portion 162R so that a specific resistance value (for example, kilo ohm) is formed in the second wiring circuit units 161R and 162R. The plurality of second resistors RR may be disposed in a series-parallel mixed form to provide a resistance value for easily identifying a crack location on the display panel 150. The plurality of second resistors RR may all have the same resistance value. However, the present disclosure is not limited thereto.

The second contact portion 163R may be located at the wiring start point of the 2-1 th wiring portion 161R, a wiring end point of the 2-2 th wiring portion 162R, and a wiring end point (or wiring change point) of the second circuit connection wiring portion 166R. The second contact portion 163R may be defined as a contact hole that assists in connecting the 2-1 th wiring portion 161R, the 2-2 th wiring portion 162R, and the second circuit connection wiring portion 166R to another wire or a pad portion.

The second jumping wiring portion 164R may be wired such that the 2-1 th wiring portion 161R and the second right panel pad portion PR2 are electrically connected to each other. The second jumping wiring portion 164R may have one side connected to the second contact portion 163R located at the wiring start point of the 2-1 th wiring portion 161R, and the other side connected to the second right panel pad portion PR2. The second jumping wiring portion 164R may be insulated by an insulating layer and positioned on a different layer from that of the 2-1 th wiring portion 161R and the 2-2 th wiring portion 162R. The second jumping wiring portion 164R may be located on a layer higher or lower than that of the 2-1 th wiring portion 161R and the 2-2 th wiring portion 162R.

The second pad connection wiring portion 165R may be wired such that the first right panel pad portion PR1, the third right panel pad portion PR3, and the fourth right panel pad portion PR4 are electrically connected to one another. The second pad connection wiring portion 165R may be located on the same layer as that of the 2-1 th wiring portion 161R and the 2-2 th wiring portion 162R. The second pad connection wiring portion 165R may be wired from the fourth right panel pad portion PR4 to extend to an area close to a lower right display area AA. A wiring end point of the second pad connection wiring portion 165R may be located in the area close to the lower right display area AA.

The second circuit connection wiring portion 166R may be wired along the fourth non-display area AA such that the 2-2 th wiring portion 162R is connected to the first pad connection wiring portion 165L. The second circuit connection wiring portion 166R may have one side connected to the second contact portion 163R formed at the wiring end point of the 2-2 th wiring portion 162R, and the other end connected to the first contact portion 163L formed at the wiring end point of the first pad connection wiring portion 165L. The second circuit connection wiring portion 166R may be insulated by an insulating layer and located on a different layer from that of the 1-1 th wiring portion 161L and the 1-2 th wiring portion 162L. The second circuit connection wiring portion 166R may be located on a layer higher or lower than that of the 1-1 th wiring portion 161L and the 1-2 th wiring portion 162L. The second circuit connection wiring portion 166R may be located on the same layer as that of the second jumping wiring portion 164R. Here, as an example, the second circuit connection wiring portion 166R is spaced apart from the first circuit connection wiring portion 166L and wired in parallel. However, when the first circuit connection wiring portion 166L and the second circuit connection wiring portion 166R are located on different layers, circuit connection wiring portions may have a crossing relationship.

Meanwhile, note that, in the above description, in order to facilitate a description related to a connection relationship between the wiring portion and the pad portion of the measurement circuit, a pad positioned at an outermost left of the left panel pad portions PL1 to PL4 of the panel pad portion PAD1 is defined as the first left panel pad portion PL1, and a pad positioned at an outermost right of the right panel pad portions PR1 to PR4 of the panel pad portion PAD1 is defined as the first right panel pad portion PR1.

As illustrated in FIGS. 8 to 10, the flexible circuit board 170 may include a substrate pad portion PAD2, test terminals TL and TR, etc. The substrate pad portion PAD2 of the flexible circuit board 170 may be a pad for electrical connection to the panel pad portion PAD1 for the display panel 150. The panel pad portion PAD1 for the display panel 150 and the substrate pad portion PAD2 of the flexible circuit board 170 may be electrically connected to each other by a conductive adhesive member 175 (ACF) disposed therebetween.

The substrate pad portion PAD2 may include left substrate pad portions LL1 to LL4 and right substrate pad portions RR1 to RR4. The left substrate pad portions LL1 to LL4 may be disposed to correspond to the left panel pad portions PL1 to PL4, and the right substrate pad portions RR1 to RR4 may be disposed to correspond to the right panel pad portions PR1 to PR4.

The left substrate pad portions LL1 to LL4 may be connected to left test terminals TL, respectively, through wires. The second left substrate pad portion LL2 and the third left substrate pad portion LL3 among the left substrate pad portions LL1 to LL4 may be electrically connected to each other by a left connection portion LC. The right substrate pad portions RR1 to RR4 may be connected to right test terminals TR, respectively, through wires. The second right substrate pad portion RR2 and the third right substrate pad portion RR3 among the right substrate pad portions RR1 to RR4 may be electrically connected to each other by a right connection portion RC.

The test terminals TL and TR may be pads with which a probe of a tester comes into contact for measurement using the tester. The probe of the tester including an ammeter A and a voltmeter V may separately come into contact with each of the left test terminal TL and the right test terminal TR.

When the probe of the tester is brought into contact with the left test terminal TL and the right test terminal TR, and current and voltage are applied, a resistance value 22 may be obtained through the fourth left substrate pad portion LL4 and the fourth right substrate pad portion RR4, and the second left substrate pad portion LL2 and the second right substrate pad portion RR2. In this instance, based on the resistance value 22 indicated by the tester, it is possible to measure the presence or absence of a crack in the display panel and to measure the bonding resistance between the display panel and the flexible circuit board, which will be addressed below.

Figure 11:
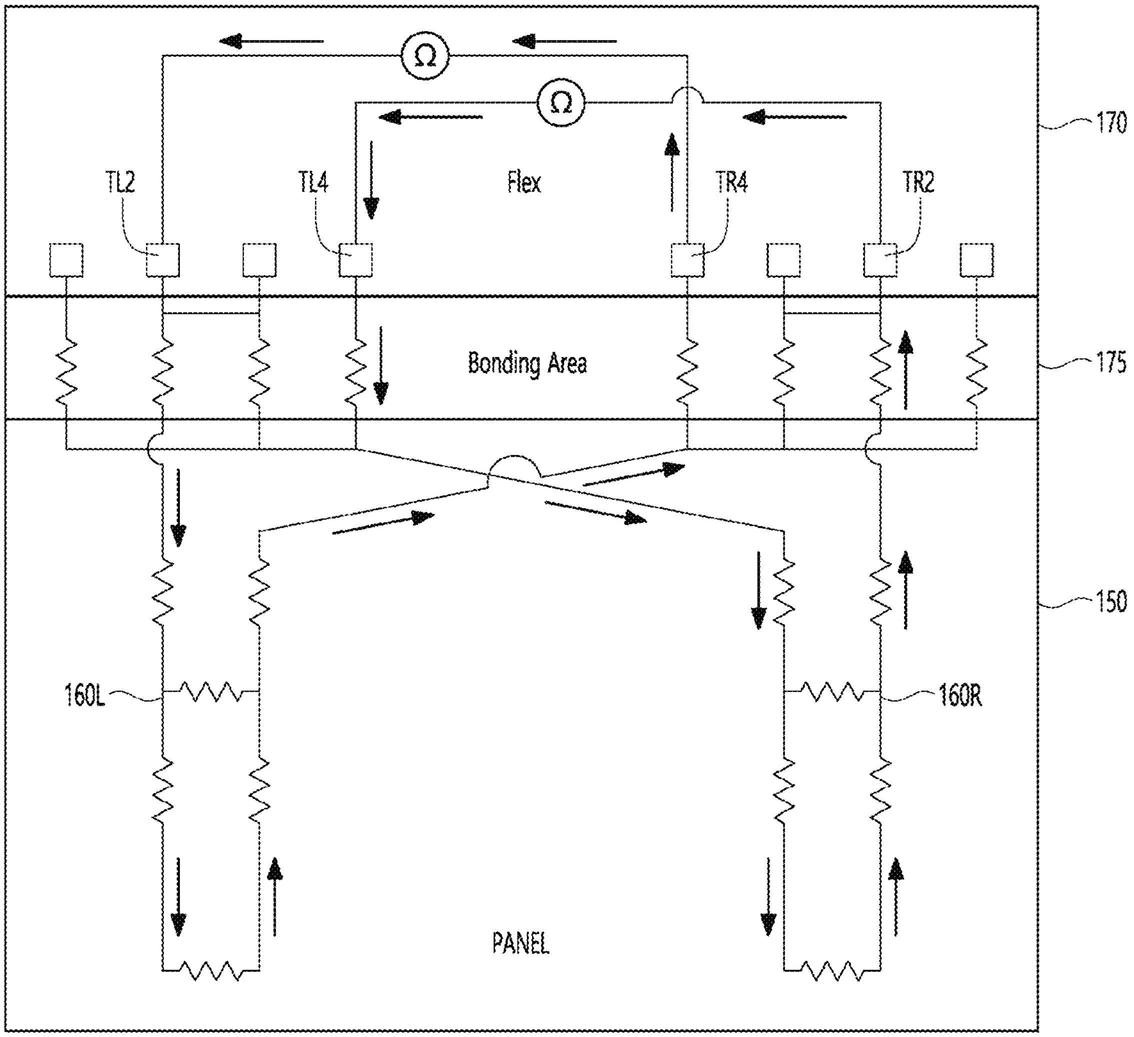
FIG. 11 is a diagram for describing a method of measuring the presence or absence of a crack in the display panel using the integrated measurement circuit.
Figure 12:
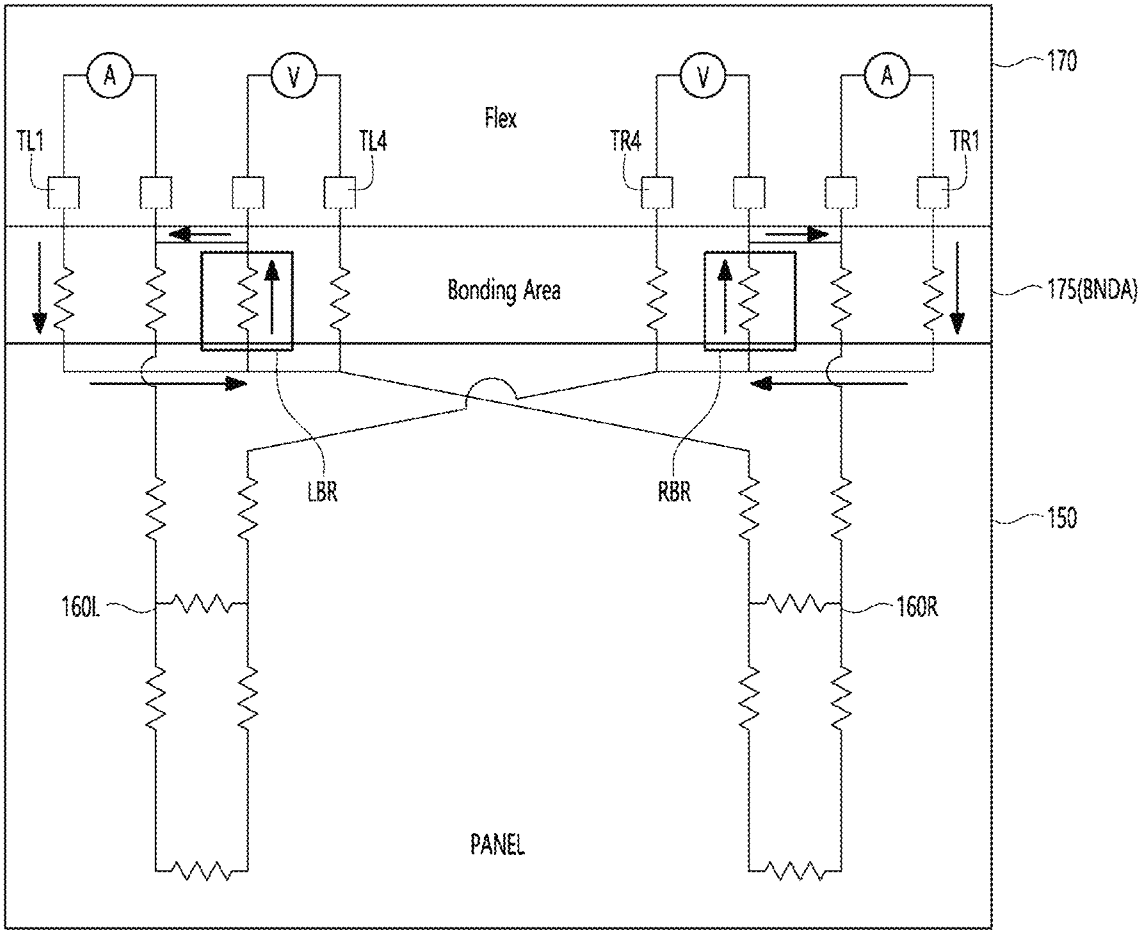
FIGS. 12 and 13 are diagrams for describing a method of measuring bonding resistance between the display panel and the flexible circuit board using the integrated measurement circuit.
Figure 13:
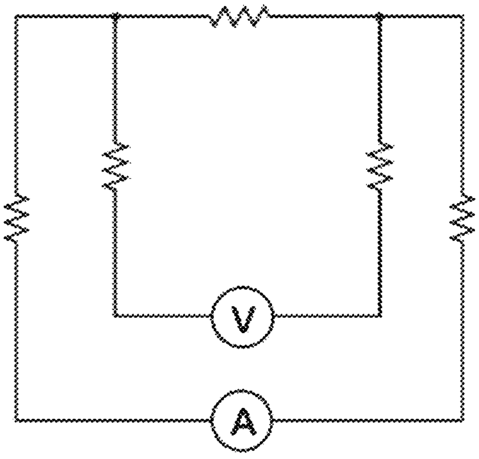

FIG. 11 is a diagram for describing a method of measuring the presence or absence of a crack in the display panel using the integrated measurement circuit, and FIGS. 12 and 13 are diagrams for describing a method of measuring bonding resistance between the display panel and the flexible circuit board using the integrated measurement circuit.

As illustrated in FIG. 11, the resistance value formed in the first integrated measurement circuit 160L may be found by bringing the probe of the tester into contact with the second left test terminal TL2 and the fourth right test terminal TR4. In addition, the resistance value formed in the second integrated measurement circuit 160R may be found by bringing the probe of the tester into contact with the fourth left test terminal TL4 and the second right test terminal TR2.

As described above, the plurality of first resistors RL included in the first integrated measurement circuit 160L and the second integrated measurement circuit 160R is artificially formed to measure a crack in the display panel. Accordingly, the probe of the tester may be brought into contact with the test terminals TL2 and TR4, and TL4 and TR2, and the presence or absence of a crack in the display panel may be determined based on whether a resistance value measured therefrom is the same as a set resistance value. In this instance, a flow of resistance measurement may occur as in a direction of an arrow. However, the reverse may occur, and thus the flow should be interpreted as an example for better understanding.

As illustrated in FIG. 12, the display panel 150 and the flexible circuit board 170 may be electrically connected to (in contact with) each other and attached to each other by the conductive adhesive member 175 formed on the pad portion thereof. An area in which the display panel 150 and the flexible circuit board 170 are electrically connected and attached to each other by the conductive adhesive member 175 may be defined as a bonding area BNDA.

Although not artificially formed in the bonding area BNDA, bonding resistances (or contact resistances) LBR and RBR may be formed by a material included in the pad portion, a conductive material, etc. The display panel 150 and the flexible circuit board 170 may have the form of a 4-wire bonding resistance measurement circuit as illustrated in FIG. 13 by bonding resistances LBR and RBR formed by contact therebetween, wiring portions, and pad portions. The 4-wire bonding resistance measurement circuit is a structure widely used to reduce resistance measurement errors due to contact resistance and wiring resistance.

As such, since contact resistance and wiring resistance exist in the bonding area BNDA, when the probe of the tester including the ammeter A and the voltmeter V is brought into contact with each of the left test terminals TL1 to RL4 and the right test terminals TR1 to TR4, and current and voltage are applied, it is possible to measure bonding resistance between the pad portion of the display panel 150 and the pad portion of the flexible circuit board 170. In this instance, even though current and voltage may flow in directions of arrows, the reverse may also occur, and thus it should be interpreted as an example for better understanding.

Accordingly, when the probe of the tester is brought into contact with each of the test terminals TL1 to RL4 and TR1 to TR4, and current and voltage are applied, it is possible to determine a bonding state between the display panel 150 and the flexible circuit board 170 based on a change in current, a change in voltage, or a change in current and voltage.

Meanwhile, in the above description, in order to facilitate understanding of the aspect of the present disclosure, the method of measuring the presence or absence of a crack in the display panel using the integrated measurement circuit and the method for measuring the bonding resistance between the display panel and the flexible circuit board have been separately described.

However, according to the aspect of the present disclosure, measurement of the presence or absence of the crack in the display panel and measurement of the bonding resistance between the display panel and the flexible circuit board may be unified by one integrated measurement circuit. As a result, when the display device is implemented based on the integrated measurement circuit according to the aspect of the present disclosure, a circuit for measuring the presence or absence of the crack in the display panel and a circuit for measuring the bonding resistance between the display panel and the flexible circuit board do not have to be separately provided, and thus it is possible to simplify the circuit.

In addition, according to the aspect of the present disclosure, since measurement of the presence or absence of the crack in the display panel and measurement of the bonding resistance between the display panel and the flexible circuit board may be performed together based on a single integrated measurement circuit, it is possible to implement two types of circuits using a total of eight pad portions by reducing the number of pad portions by two compared to the conventional one. As a result, when the display device is implemented based on the integrated measurement circuit according to the aspect of the present disclosure, it is possible to reduce bezels when manufacturing a display panel of not only a general rectangular display panel but also a circular, oval, or polygonal display panel not having sufficient bezels, and to increase a degree of freedom in design.

As described above, the present disclosure has an effect of simplifying the circuit by unifying the crack measurement circuit of the display panel and the bonding resistance measurement circuit between the display panel and the flexible circuit board into one integrated measurement circuit. In addition, the present disclosure has an effect of not only reducing bezels but also increasing the degree of freedom in design when manufacturing the display panel based on simplification of the measurement circuit.

It will be apparent to those skilled in the art that various modifications and variations can be made in the present disclosure-without departing from the spirit or scope of the disclosure. Thus, it is intended that the present disclosure cover the modifications and variations of this disclosure provided they come within the scope of the appended claims and their equivalents.

What is claimed is:

1. A display device comprising:

a display panel including a display area and a non-display area, the non-display area including a first non-display area, a second non-display area, a third non-display area and a fourth non-display area;

first and second wiring circuit units located in the first non-display area, the second non-display area, and the third non-display area of the display panel; and a panel pad portion located in the fourth non-display area of the display panel, the panel pad portion having a left panel pad portion located on a left side of the fourth non-display area and a right panel pad portion located on a right side of the fourth non-display area, wherein the first wiring circuit unit has a wiring start point and a wiring end point, the second wiring circuit unit has a wiring start point and a wiring end point, the wiring start point of the first wiring circuit unit is directly connected to a pad portion included in the left panel pad portion, and the wiring end point of the first wiring circuit unit is located at the left panel pad portion and electrically connected to a pad portion included in the right panel pad portion via a first circuit connection wiring portion located in the fourth non-display area of the display panel, wherein the first circuit connection wiring portion is connected to the wiring end point of the first wiring circuit unit via a first contact portion, and wherein the first circuit connection wiring portion is located on a different layer than the first wiring circuit unit.

2. The display device according to claim 1, wherein the wiring start point of the second wiring circuit unit is electrically connected to the pad portion included in the right panel pad portion, and wherein the wiring end point of the second wiring circuit unit is electrically connected to the pad portion included in the left panel pad portion.

3. The display device according to claim 2, wherein the wiring start point of the first wiring circuit unit is electrically connected to the pad portion included in the left panel pad portion by a first jumping wiring portion located on a layer different from a layer of the first wiring circuit unit and the second wiring circuit unit, and wherein the wiring end point of the first wiring circuit unit is electrically connected to the pad portion included in the right panel pad portion by the first circuit connection wiring portion located on a layer different from a layer of the first wiring circuit unit and the second wiring circuit unit.

4. The display device according to claim 3, wherein the wiring start point of the second wiring circuit unit is electrically connected to the pad portion included in the right panel pad portion by a second jumping wiring portion located on a layer different from a layer of the first wiring circuit unit and the second wiring circuit unit, and wherein the wiring end point of the second wiring circuit unit is electrically connected to the pad portion included in the left panel pad portion by a second circuit connection wiring portion located on a layer different from a layer of the first wiring circuit unit and the second wiring circuit unit.

5. The display device according to claim 4, wherein the left panel pad portion includes a first left panel pad portion, a second left panel pad portion, a third left panel pad portion and a fourth left panel pad portion, the first, third, and fourth left panel pad portions are electrically connected to the second circuit connection wiring portion by a first pad connection wiring portion, and the second left panel pad portion is electrically connected to the wiring start point of the first wiring circuit unit by the first jumping wiring portion.

6. The display device according to claim 4, wherein the right panel pad portion includes a first right panel pad portion, a second right panel pad portion, a third right panel pad portion and a fourth right panel pad portion, and the first, third, and fourth right panel pad portions are electrically connected to the first circuit connection wiring portion by a second pad connection wiring portion, and the second right panel pad portion is electrically connected to the wiring start point of the second wiring circuit unit by the second jumping wiring portion.

7. The display device according to claim 2, wherein the first wiring circuit unit includes a 1-1 th wiring portion connected to the wiring start point of the first wiring circuit unit, a 1-2 th wiring portion connected to the wiring end point of the first wiring circuit unit, and a plurality of first resistors connected in series and parallel to the 1-1 th wiring portion and the 1-2 th wiring portion, and the second wiring circuit unit includes a 2-1 th wiring portion connected to the wiring start point of the second wiring circuit unit, a 2-2 th wiring portion connected to the wiring end point of the second wiring circuit unit, and a plurality of second resistors connected in series and parallel to the 2-1 th wiring portion and the 2-2 th wiring portion.

8. The display device according to claim 7, wherein the plurality of first resistors or the plurality of second resistors is configured to determine presence or absence of a crack in the display panel.

9. A measurement circuit comprising:

first and second wiring circuit units located in a first region, a second region, and a third region of a substrate; and a pad portion located in a fourth region of the substrate, the pad portion having a left pad portion located on a left side of the fourth region and a right pad portion located on a right side of the fourth region, wherein the first wiring circuit unit has a wiring start point and a wiring end point, and the second wiring circuit unit has a wiring start point and a wiring end point, the wiring start point of the first wiring circuit unit is electrically connected to a pad portion included in the left pad portion, and the wiring end point of the first wiring circuit unit is located at the left panel pad portion and electrically connected to a pad portion included in the right pad portion by a first circuit connection wiring portion located in the fourth region of the substrate, the wiring start point of the second wiring circuit unit is electrically connected to the pad portion included in the right pad portion, and the wiring end point of the second wiring circuit unit is located at the right panel pad portion and electrically connected to the pad portion included in the left pad portion by a second circuit connection wiring portion located in the fourth region of the substrate, each of the wiring start point of the first wiring circuit unit and the second wiring circuit unit is directly connected to a respective one of the left pad portion and the right pad portion, wherein the first circuit connection wiring portion is connected to the wiring end point of the first wiring circuit unit via a first contact portion, wherein the second circuit connection wiring portion is connected to the wiring end point of the second wiring circuit unit via second contact portion, and wherein the first circuit connection wiring portion and the second circuit unit connection wiring portion are located on a different layer than the first wiring circuit unit and the second wiring circuit unit.

10. The measurement circuit according to claim 9, wherein the wiring start point of the first wiring circuit unit is electrically connected to the pad portion included in the left pad portion by a first jumping wiring portion located on a layer different from a layer of the first wiring circuit unit and the second wiring circuit unit, the wiring end point of the first wiring circuit unit is electrically connected to the pad portion included in the right pad portion by the first circuit connection wiring portion located on a layer different from a layer of the first wiring circuit unit and the second wiring circuit unit, the wiring start point of the second wiring circuit unit is electrically connected to the pad portion included in the right pad portion by a second jumping wiring portion located on a layer different from a layer of the first wiring circuit unit and the second wiring circuit unit, and the wiring end point of the second wiring circuit unit is electrically connected to the pad portion included in the left pad portion by the second circuit connection wiring portion located on a layer different from a layer of the first wiring circuit unit and the second wiring circuit unit.

11. The measurement circuit according to claim 10, wherein the left pad portion includes a first left pad portion, a second left pad portion, a third left pad portion and a fourth left pad portion, the first, third, and fourth left pad portions are electrically connected to the second circuit connection wiring portion by a first pad connection wiring portion, and the second left pad portion is electrically connected to the wiring start point of the first wiring circuit unit by the first jumping wiring portion, the right pad portion includes a first right pad portion, a second right pad portion, a third right pad portion and a fourth right pad portion, and the first, third, and fourth right pad portions are electrically connected to the first circuit connection wiring portion by a second pad connection wiring portion, and the second right pad portion is electrically connected to the wiring start point of the second wiring circuit unit by the second jumping wiring portion.

* * * * *